(12) United States Patent
Imashiro et al.

(10) Patent No.: US 6,333,363 B1
(45) Date of Patent: Dec. 25, 2001

(54) METHOD FOR OBTAINING POLYESTER RESIN PRODUCTS HAVING DESIRED STRENGTH, AND MIXTURE USED IN SAID METHOD

(75) Inventors: Yasuo Imashiro; Ikuo Takahashi; Naofumi Horie; Shigekazu Suzuki, all of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/501,271

(22) Filed: Feb. 9, 2000

Related U.S. Application Data

(63) Continuation-in-part of application No. 09/115,795, filed on Jul. 15, 1998, now abandoned.

(30) Foreign Application Priority Data

Jul. 18, 1997 (JP) .................................................... 9-209803

(51) Int. Cl.⁷ ...................................................... C08J 11/04
(52) U.S. Cl. ............................ 521/48; 525/437; 525/444
(58) Field of Search ................................... 525/437, 440; 521/48

(56) References Cited

U.S. PATENT DOCUMENTS 4,022,752 * 5/1977 Horn ..................................... 525/437
4,071,503 * 1/1978 Thomas ................................ 525/440

FOREIGN PATENT DOCUMENTS 892 016 * 1/1999 (EP) .
96 11978 * 4/1996 (WO) .

OTHER PUBLICATIONS

Steiner, U. B. et al "The Role of Additives in the Solid State Polycondensation of Recycled Polyethylene Terephthalate (PET)," pp 157–171, *ARC '96 Technology The Spark in Recycling*, SPE Recycling Div. 3rd Annual Recycling Conf. Proc., Nov. 7, 1996, Chicago, Il.*

* cited by examiner

*Primary Examiner*—Patricia A. Short
(74) *Attorney, Agent, or Firm*—Kubovcik & Kubovcik

(57) ABSTRACT

A method for obtaining polyester resin products having a desired strength and a mixture used in a method for obtaining polyester resin products having a desired strength. In the method and mixture a carbodiimide compound is added to a polyester resin. According to the method and mixture, polyester resin pellets having a desired strength can be obtained by adding a carbodiimide compound to a recovered polyester resin such as a recovered PET resin. Strength of the polyester resin during processing of the polyester resin is maintained.

8 Claims, No Drawings

METHOD FOR OBTAINING POLYESTER RESIN PRODUCTS HAVING DESIRED STRENGTH, AND MIXTURE USED IN SAID METHOD

This application is a continuation-in-part of application Ser. No. 09/115,795, filed Jul. 15, 1998, now abandoned.

BACKGROUND OF THE INVENTION (1) Field of the Invention

The present invention relates to a method for obtaining polyester resin products having a desired strength, as well as to a mixture used in the method. More particularly, the present invention relates to a method for obtaining polyester resin products having a desired strength by adding a carbodiimide compound to a material polyester resin, as well as to a mixture used in the method.

(2) Description of the Prior Art

In recent years, environmental pollution caused by plastic waste has become a bigger problem, and the necessity for and significance of environmental protection has become more important. Under such circumstances, ways are being sought for recovery and regeneration of used plastic materials for effective reutilization thereof.

In particular, polyethylene terephthalate resin (hereinafter abbreviated to PET resin), which is used as a container for clean drinking water or the like, is currently disposed by reclamation or incineration. Therefore, methods for effective reutilization of used PET resin are being sought from the two aspects of resource saving and environmental protection.

The reutilization methods include a material recycling method which comprises changing the form of a used material into a different form by a physical treatment, for making possible the reutilization.

This material recycling method is actually being applied to the recycling of used PET resin. In the method, however, impurities are easily taken in; therefore, there are problems that the regenerated product is lower in purity, strength and heat resistance than the original product and consequently has limited applications. These problems are considered to be caused by the following reasons.

Ordinarily, when recovered PET resin is processed for reutilization, the recovered PET resin in the form of bottles or the like is first ground into flakes and then processed into products (e.g., pellets). In this operation, the PET resin is deteriorated because it undergoes, in an extruder, hydrolysis (caused by the water which adheres thereto during washing or the like), oxidative decomposition and/or thermal decomposition.

In ordinary resin recycling, recovered resin is dried at 140 to 160° C. for about 5 hours in order to prevent the above-mentioned deterioration. This drying requires a facility investment and a running cost for the facility and, in recycling of used PET resin bottles or the like, incurs a big increase in cost; therefore, the drying is eliminated in some cases, which inevitably invites the deterioration of the PET resin.

There is a further problem. That is, PET resin bottles are produced from PET resins of various intrinsic viscosities (IV) ranging from about 0.6 to 1.2, depending upon the application of the bottles; bottles for soy sauce have an IV of 0.65, bottles for mineral water or tea have an IV of 0.75, bottles for carbonated drinks or the like have an IV of 0.8 to 8.5 and bottles for medical or cosmetic use have an IV of 1.2.

Thus, various PET resin bottles different in properties are collected and ground into flakes at a regeneration plant. Therefore, the flakes have a large fluctuation in properties, and the products, e.g., pellets obtained from the flakes by the use of an extruder are very low in quality.

For the above reason, virgin PET resin must be added to recovered PET resin in order to allow the regenerated product to have a desired strength. Generally, about 30%, based on regenerated product, of virgin PET resin has heretofore been added to recovered PET resin, and the times of reutilization have been about 3. This has made the recycling cost even higher.

Thus, while recovery and reutilization of used polyester resins, particularly used PET resin is required, no satisfactory method therefor is developed yet.

SUMMARY OF THE INVENTION

The objects of the present invention are to alleviate the above-mentioned problems of the prior art and to provide a method for obtaining polyester resin products having a desired strength and a mixture used in the method.

In other words, the objects of the present invention are to alleviate the above-mentioned problems of the prior art and provide a method for maintaining a strength of polyester resin during processing of said polyester resin and a mixture used in the method.

The present inventors made an intensive study in order to develop a method for obtaining polyester resin products having a satisfactory strength (i.e., a method for maintaining a strength of polyester resin during processing such as a result, the present inventors found out that when a carbodiimide compound (including a polycarbodiimide compound) having at least one carbodiimide group in the molecule is added to a polyester resin (e.g. a Recovered PET resin) and the resulting mixture is kneaded and shaped, the PET resin is improved in mechanical strength and, when the PET resin is a recovered PET resin wherein hydrolysis has progressed to a certain degree, the tensile strength of the recovered PET resin can be restored to about the same level as a virgin PET resin (an unused PET resin).

The present inventors further found out that the addition of the above carbodiimide compound to a recovered PET resin to be regenerated can reduce the amount of the virgin PET resin added in processing of the recovered PET resin into a regenerated product, and the addition is useful in recycling of polyester resin, particularly PET resin. The above finding has led to the completion of the present invention.

According to the present invention, there are provided:

a method for obtaining polyester resin products having a desired strength, which method comprises adding a carbodiimide compound to a material polyester resin, and a mixture used in a method for obtaining polyester resin products having a desired strength, which mixture is obtained by adding a carbodiimide compound to a material polyester resin.

According to the present invention, there are further provided:

a method for maintaining a strength of polyester resin during processing of said polyester resin, which method comprises adding a carbodiimide compound to a material polyester resin, and a mixture used in a method for maintaining a strength of polyester resin during processing of said polyester resin, which mixture is obtained by adding a carbodiimide compound to a material polyester resin.

DETAILED DESCRIPTION OF THE INVENTION

The present invention is hereinafter described in detail.

The polyester resin used in the present invention is an ester between (1) at least one dihydroxy compound selected from aliphatic glycols (e.g. ethylene glycol, propylene glycol, diethylene glycol, 1,4-butanediol, neopentyl glycol and hexamethylene glycol), alicyclic glycols (e.g. cyclohexanedimethanol) and aromatic dihydroxy compounds (e.g. bisphenol) and (2) at least one dicarboxylic acid selected from aromatic dicarboxylic acids (e.g. terephthalic acid, isophthalic acid and 2,6-naphthalenedicarboxylic acid), aliphatic dicarboxylic acids (e.g. oxalic acid, succinic acid, adipic acid, sebacic acid and undecanedicarboxylic acid) and alicyclic dicarboxylic acids (e.g. hexahydrodicarboxylic acid).

The above polyester resin may be modified with a small amount of a triol or a tricarboxylic acid.

Specific examples of the polyester resin are polyethylene terephthalate, polypropylene terephthalate, polybutylene terephthalate and polyhexamethylene terephthalate.

Of the polyester resins used in the present invention, PET resin (for which effective reutilization is sought for the reasons of resource saving and environmental protection) can generally be synthesized by subjecting terephthalic acid or dimethyl terephthalate and ethylene glycol to a condensation reaction in the presence of a catalyst under appropriate conditions. In this synthesis, addition of at least one appropriate third component before the completion of the reaction can produce a copolymer PET resin.

As the appropriate third component, there can be mentioned (a) compounds having two ester-forming functional groups, for example, aliphatic dicarboxylic acids (e.g. oxalic acid, adipic acid and succinic acid), alicyclic dicarboxylic acids (e.g. hexahydrodicarboxylic acid), aromatic dicarboxylic acids (e.g. phthalic acid, isophthalic acid and diphenyldicarboxylic acid), oxycarboxylic acids (e.g. glycolic acid), oxy compounds (e.g. polyalkylene glycol), functional derivatives thereof, and high polymers derived from the above carboxylic acids, oxycarboxylic acids, oxy compounds or functional derivatives thereof; (b) compounds having one ester-forming functional group, for example, benzoic acid and benzyloxybenzoic acid; and (c) compounds having three or more ester-forming functional groups, for example, glycerine, pentaerythritol and trimethylolpropane.

The method of the present invention is particularly applicable to processing of a recovered polyester resin and, more particularly, to processing of a recovered PET resin. A recovered resin is one that is obtained from a recycled resin such as recycled PET resin and is made into products for reuse. The recovered resin is typically in the form of finely ground flakes or the like obtained by the pulverization of molded products of the resin.

In the present application, the recovered polyester resin is combined with a carbodiimide compound and the mixture processed into an intermediate or final product. Most typically, because of ease of processing, the mixture is pelletized to form polyester resin pellets. Alternatively, the recovered polyester resin, e.g., recovered PET resin, can be formed directly into injection molded products or film products.

The carbodiimide compound having at least one carbodiimide group in the molecule (the carbodiimide compound includes a polycarbodiimide compound), used in the present invention can be a carbodiimide compound produced by a well-known method. It can be, for example, a carbodilmide compound produced by subjecting a polyisocyanate to decarboxylation and condensation using a catalyst (an organic phosphorus compound or an organometal compound) in a solventless state or in an inert solvent at a temperature of about 70° C. or higher.

The monocarbodiimide compound as the carbodiimide compound used in the present invention can be exemplified by dicyclohexylcarbodiimide, diisopropylcarbodiimide, dimethylcarbodiimide, diisobutylcarbodiimide, dioctylcarbodiimide, tert-butylisopropylcarbodiimide, diphenylcarbodiimide, di-tert-butylcarbodiimide and di-β-naphthylcarbodiimide. Of these, preferred are dicyclohexylcarbodiimide and diisopropylcarbodiimide in view of the commercial availability, in particular.

The polycarbodiimide compound as the carbodiimide compound used in the present invention can be a polycarbodiimide produced by one of various processes. It can basically be a polycarbodiimide produced by conventional processes for polycarbodiimide production [U.S. Pat. No. 2941956; Japanese Patent Publication No. 33279/1972; J. Org. Chem. 28, 2069–2075 (1963); Chemical Review 1981, Vol. 81 No. 4, pp. 619–621].

The organic diisocyanate which is a raw material in production of the polycarbodiimide compound, includes, for example, aromatic diisocyanates, aliphatic diisocyanates, alicyclic diisocyanates, and mixtures thereof. Specific examples thereof are 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,45-diisocyanate, methylcyclohexane diisocyanate, tetramethylxylylene diisocyanate, 2,6-diisopropylphenyl isocyanate and 1,3,5-triisopropylbenzene-2,4-diisocyanate.

It is possible to allow the polycarbodiimide compound to have an appropriate polymerization degree, by using a compound (e.g. a monoisocyanate) capable of reacting with the terminal isocyanate of the polycarbodiimide compound.

As the monoisocyanate used for terminal blocking and polymerization degree control of polycarbodiimide compound, there can be mentioned, for example, phenyl isocyanate, tolyl isocyanate, dimethylphenyl isocyanate, cyclohexyl isocyanate, butyl isocyanate and naphthyl isocyanate.

The terminal blocking agent used for polymerization degree control of polycarbodiimide compound is not restricted to the above monoisocyanates and further includes active hydrogen-containing compounds capable of reacting with the terminal isocyanate. Examples thereof are hydroxyl group-containing aliphatic, aromatic or alicyclic compounds (methanol, ethanol, phenol, cyclohexanol, N-methylethanolamine, polyethylene glycol monomethyl ether, polypropylene glycol monomethyl ether); =NH group-containing compounds (diethylamine, dicyclohexylamine);—NH2 group-containing compounds (butylamine, cyclohexylamine);—COOH group-containing compounds (succinic acid, benzoic acid, cyclohexanoic acid); —SH group-containing compounds (ethylmercaptan, allylmercaptan, thiophenol); and epoxy group-containing compounds.

The decarboxylation and condensation of the organic diisocyanate is conducted in the presence of an appropriate carbodiimidization catalyst. As the carbodiimidization catalyst, there are preferably used organic phosphorus compounds and organometallic compounds represented by the general formula M—$(OR)_4$ wherein M is a metal such as Ti, Na, K, V, W, Hf, zr, Pb, Mn, Ni, Ca, Ba or the like, and R is a $C_1$-20 alkyl group or an aryl group. Of the organic phosphorus compounds, phosphorene oxides are preferred and, of the organometal compounds, alkoxides of Ti, Hf or zr are preferred, for their activities.

Specific examples of the phosphorene oxides are 3-methyl-1-phenyl-2-phosphorene-1-oxide, 3-methyl-1-ethyl-2-phosphorene-1-oxide, 1,3-dimethyl-2-phosphorene-1-oxide, 1-phenyl-2-phosorene-1-oxde1ide, 1-ethyl-2-phosphorene-1-oxide, 1-methyl-2-phosphorene-1-oxide, and double bond isomers thereof. Of these, particularly preferred is 3-methyl-1-phenyl-2-phosphorene-1-oxide for the commercial availability.

Aliphatic carbodiimides avoid potential problems relating to the generation of gas when heated and, therefore, are preferred.

The mixture of the present invention used in the present method for obtaining polyester resin products having a desired strength is a mixture obtained by adding the above-mentioned carbodiimide compound to the above-mentioned polyester resin, and is useful for carrying out the present method for obtaining polyester resin products having a desired strength.

In the mixture of the present invention, there is no particular restriction as to the form of the polyester resin and the carbodiimide compound. However, when the polyester resin is PET resin, the PET resin is ordinarily used in the form of flakes or pellets.

In the present mixture, the amount of the carbodiimide compound used is preferably 0.01 to 10 parts by weight, particularly, preferably 0.1 to 5 parts by weight per 100 parts by weight of the polyester resin. When the amount is less than 0.01 part by weight, it is impossible to obtain polyester resin products having a desired strength (e.g., the strength of polyester resin during pelletization can not be maintained). When the amount is more than 10 parts by weight, the properties of the polyester resin may be impaired.

The mixture of the present invention can be obtained by dissolving the carbodiimide compound and the polyester resin in an organic solvent and then removing the solvent by distillation. The organic solvent is desirably an organic solvent which is capable of dissolving the polyester resin, is non-polymerizable and has no active hydrogen. Specific examples of the organic solvent are chloroform and tetrahydrofuran (THF).

The mixing of the carbodiimide compound into the polyester resin can be conducted by melt-kneading using an extruder, or by mixing of the carbodiimide compound into the polyester resin of the synthesis.

In using polyester resin pellets obtained by the present invention, it is possible to add, as necessary, a reinforcing agent, an inorganic or organic filler, an antioxidant, a heat stabilizer, an ultraviolet absorber, a lubricant, a wax, a coloring agent, a crystallization accelerator, etc., as is done in conventional polyester resin pellets.

Pellets obtained by the present invention can be molded by extrusion molding or injection molding, generally used for polyester resin.

DESCRIPTION OF PREFERRED EMBODIMENTS

The present invention is described in more detail below by way of Examples.

Synthesis Example 1

590 g of 4,4'-dicyclohexylmethane diisocyanate, 62.6 g of cyclohexyl isocyanate and 6.12 g of a carbodiimidization catalyst (3-methyl-1-phenyl-2-phosphorene-1-oxide) were reacted at 180° C. for 48 hours to obtain 4,4'-dicyclohexylmethanecarbodiimide (polymerization degree=10).

Synthesis Example 2

549 g of tetramethylxylylene diisocyanate, 49.5 g of n-butyl isocyanate and 5.99 g of a carbodiimidization catalyst (3-methyl-1-phenyl-2-phosphorene-1-oxide) were reacted at 180° C. for 48 hours to obtain tetramethylxylylenecarbodiimide (polymerization degree=10).

Synthesis Example 3

500 g of 4,4'-dicyclohexylmethane diisocyanate and 5.0 of a carbodiimidization catalyst (tetrabutyl titanate) were reacted at 180° C. for 12 hours. Then, 40.0 g of polyethylene glycol monomethyl ether was added, and a reaction was allowed to take place at 120° C. for 3 hours for urethanization of terminal isocyanate group, whereby polyethylene glycol terminated 4,4'-dicyclohexylmethanecarbodiimide (polymerization degree=5.5) was obtained.

Examples 1 to 10

A recovered PET resin, a virgin PET resin and one of the carbodiimides synthesized in Synthesis Examples 1 to 3 were dry-blended at the proportions shown in Table 1. The blend was kneaded by the use of a twin-screw extruder to form pellets. The pellets were passed through the T die of an extruder to form a film having a thickness of 200 μm and the film was taken off. JIS No. 4 dumbbells (specimens for tensile strength) were made from the film by punching and measured for tensile strength. The results are shown in Table 1.

Tensile strength was measured by using a tensile strength tester (GA-10, a product of Shimadzu Corporation) under the conditions of tensile speed of 10 mm/min and distance between chucks of 55 mm and calculating an average of the tensile strengths of five specimens.

Comparative Examples 1 to 4

The same operation and test as in Example 1 were conducted except that no carbodiimide compound was used. The results are shown in Table 1.

Reference Examples 1 and 2

The same operation and test as in Example 1 were conducted except that neither recovered PET resin nor carbodiimide compound was used (Reference Example 1) or no recovered PET resin was used (Reference Example 2). The results are shown in Table 1.

TABLE 1

| | Recovered PET resin (parts by weight) | Virgin PET resin (parts by weight) | Synthesis Example No. of Carbodiimide | Amount of Carbodiimide (parts by weight) | MFR | Tensile Strength (Kgf/mm$^2$) | Change (%) |
|---|---|---|---|---|---|---|---|
| Example 1 | 25 | 75 | 1 | 1 | 27 | 771 | 100 |
| Example 2 | 50 | 50 | 1 | 1 | 28 | 771 | 100 |
| Example 3 | 75 | 25 | 1 | 1 | 30 | 770 | 99 |
| Example 4 | 100 | 0 | 1 | 1 | 31 | 766 | 100 |
| Example 5 | 25 | 75 | 2 | 1 | 26 | 773 | 100 |
| Example 6 | 25 | 75 | 3 | 1 | 25 | 775 | 100 |
| Example 7 | 25 | 75 | 1 | 0.1 | 40 | 767 | 99 |
| Example 8 | 25 | 75 | 1 | 0.5 | 30 | 778 | 100 |
| Example 9 | 25 | 75 | 1 | 5.0 | 26 | 766 | 100 |
| Example 10 | 25 | 75 | 1 | 10.0 | 15 | 764 | 100 |
| Comp. Exa. 1 | 25 | 75 | | | 48 | 746 | 96 |
| Comp. Exa. 2 | 50 | 50 | | | 52 | 718 | 93 |
| Comp. Exa. 3 | 75 | 25 | | | 56 | 689 | 89 |
| Comp. Exa. 4 | 100 | 0 | | | 60 | 661 | 85 |
| Ref. Exa. 1 | 0 | 100 | | | 44 | 775 | 100 |
| Ref. Exa. 2 | 0 | 100 | 1 | 1 | 25 | 770 | 99 |

Note:
Change (%) was expressed by taking the tensile strength of Reference Example 1 as 100.
"Comp. Exa." refers to "Comparative Example" and
"Ref. Exa." refers to "Reference Example".

Example 11

The specimens for tensile strength obtained in Examples 2 and 4 were subjected to a hydrolysis acceleration test. The hydrolysis acceleration test was such that a specimen and distilled water were placed in a pressure bottle and heated at 120° C. and, after a given length of time (0 hour, 12 hours, 24 hours, 36 hours, 48 hours, 60 hours, 72 hours, 84 hours or 96 hours), the specimen was measured for tensile strength. The results are shown in Table 2.

Comparative Example 5

The same test as in Example 11 were conducted except that the specimen for tensile strength obtained in Comparative Example 4 was used. The results are shown in Table 2.

TABLE 2

| | Tensile Strength (Kgf/mm$^2$) Time for hydrolysis acceleration (hr) | | | | | | | | |
|---|---|---|---|---|---|---|---|---|---|
| Specimen | 0 | 12 | 24 | 36 | 48 | 60 | 72 | 84 | 96 |
| Example 2 | 771 | 774 | 768 | 740 | 694 | 410 | 220 | 113 | 50 |
| Example 4 | 766 | 771 | 770 | 733 | 689 | 406 | 214 | 105 | 45 |
| Comparative Example 4 | 661 | 520 | 286 | 182 | 120 | 95 | — | — | — |
| Reference Example 1 | 775 | 690 | 463 | 201 | 160 | 102 | — | — | — |
| Reference Example 2 | 770 | 775 | 770 | 745 | 706 | 426 | 247 | 167 | 73 |

Example 12

A polycarbodurnide compound obtained in Synthetic Example 1 was blended dry with recovered PET flakes to give a 1% mixture, which was then made with an injection molder into pieces having a thickness of 3.1 mm and shaped like an ASTM No. 1 dumb-bell. The product obtained therefrom by molding was excellent in appearance and in physical properties.

Comparative Example 6

The same materials and method as Example 12 were employed except that the polycarbodiimide compound was not used. During molding whereby the molten PET resin was discharged through the nozzle of an injection molder, the resin was drawn down, and thus a good molded product was not obtained.

Examples 13 to 15

Each of the carbodiimide compounds synthesized in Synthetic Examples 1 to 3 was blended with recovered PET to give a 1 wt. % mixture with respect to the weight of the recovered PET, and the mixture was kneaded in a biaxial extruder with a T-shaped die, to produce a film having a thickness of 200 μm. Preparation of pieces having a JIS No. 4 dumbbell shape was achieved by punching the film; the piece served as the test piece for the measurement of tensile strength; and the tensile strength of each film was determined.

The tensile test consisted of using a tensile test meter (versatile tester, model 5544 provided by Instron), applying a tension by pulling the piece at 10 mm/min, and fixing the distance between the holding sections at 55 mm. The results obtained from five test pieces were averaged.

Determination of the melt flow rate (MFR) consisted of using a melt flow indexer provided by Uwajima Manufacturing Co., resorting to method A with a load of 2.16 kgf, and measuring the flow over 10 min at 260° C.

The results are shown in Table 3 together with the data for the products of Comparative Example 4 and Example 4.

| | Carbodiimide | Tensile strength | MFR |
|---|---|---|---|
| Example 13 | Synthetic Example 1 | 770 | 27 |
| Example 14 | Synthetic Example 2 | 771 | 28 |
| Example 15 | Synthetic Example 3 | 770 | 28 |
| Comparative Example 4 | none | 661 | 60 |
| Example 4 | Synthetic Example 1 | 766 | 31 |

According to the present invention, the tensile strength of polyester resin which shows deterioration in processing, particularly the tensile strength of recovered polyester resin) can be restored to about the same level as virgin resin.

It is possible to decrease melt flow rate (MFR) of polyester resin, especially MFR of recovered polyester resin by adding a carbodiimide compound to polyester resin, and as a result, apparent molecular weight of polyester resin is increased. Therefore, such polyester resin can be expected to be higher also in mechanical strength (e.g. bending strength) other than tensile strength.

According to the present invention, it is also possible to allow recovered polyester resin, particularly recovered PET resin, to have higher hydrolysis resistance.

What is claimed is:

1. A method for maintaining a strength of a recovered polyester resin during processing of said resin, which method comprises forming a mixture of (1) an aliphatic polycarbodiimide produced from a raw material diisocyanate selected from the group consisting of dicyclohexylmethane-4,4-diisocyanate and tetramethylxylylene-diisocyanate and (2) said recovered polyester resin and processing said mixture to form a shaped article.

2. A method according to claim 1, wherein the recovered polyester resin is recovered polyethylene terephthalate resin.

3. A method according to claim 1, wherein the amount of the carbodiimide compound is 0.01 to 10 parts by weight per 100 parts by weight of the recovered polyester resin.

4. A method according to claim 1, wherein said processing is pelletizing.

5. A mixture used in a method for maintaining a strength of recovered polyester resin during processing of said polyester resin, which mixture comprises an aliphatic polycarbodiimide produced from a raw material diisocyanate selected from the group consisting of dicyclohexylmethane-4,4-diisocyanate and tetramethylxylylene-diisocyanate and said recovered polyester resin.

6. A mixture according to claim 5, wherein the recovered polyester resin is recovered polyethylene terephthalate resin.

7. A mixture according to claim 5, wherein the amount of the carbodiimide compound is 0.01 to 10 parts by weight per 100 parts by weight of the recovered polyester resin.

8. A mixture according to claim 5, wherein said processing is pelletizing.

* * * * *